(12) United States Patent  (10) Patent No.: US 8,660,724 B2
Tarasinski et al.  (45) Date of Patent: Feb. 25, 2014

(54) DRIVE SYSTEM FOR A VEHICLE

(75) Inventors: Nicolai Tarasinski, Frankenthal (DE); Rainer Gugei, Mannheim (DE)

(73) Assignee: Deere & Company, Moline, IL (US)

( * ) Notice: Subject to any disclaimer, the term of this patent is extended or adjusted under 35 U.S.C. 154(b) by 1363 days.

(21) Appl. No.: 10/590,003

(22) PCT Filed: Mar. 2, 2005

(86) PCT No.: PCT/EP2005/050926
§ 371 (c)(1), (2), (4) Date: Jun. 13, 2007

(87) PCT Pub. No.: WO2005/090108
PCT Pub. Date: Sep. 29, 2005

(65) Prior Publication Data
US 2011/0178660 A1  Jul. 21, 2011

(30) Foreign Application Priority Data
Mar. 15, 2004  (DE) .......................... 10 2004 012 767

(51) Int. Cl.
 *B60L 9/00* (2006.01)
 *B60L 11/00* (2006.01)
 *G05D 1/00* (2006.01)
 *G05D 3/00* (2006.01)
 *G06F 7/00* (2006.01)
 *G06F 17/00* (2006.01)

(52) U.S. Cl.
 USPC ................. 701/22; 701/36; 701/51; 903/902; 903/904; 903/946; 180/65.21; 180/65.22; 180/65.265

(58) Field of Classification Search
 USPC ............................ 701/22, 50, 36, 51, 99, 101; 903/903–960; 180/65.1–65.8, 69.6, 180/165, 6.48, 6.5, 6.66, 245, 53.1–53.8; 477/2, 3, 4, 7–29; 475/5, 6; 290/40 R, 290/40 C, 40 F, 45, 50, 51; 74/11–15.88, 74/640–665 P; 123/185.1–185.13; 310/156.66, 156.69, 156.71, 156.73, 310/257, 263
See application file for complete search history.

(56) References Cited

U.S. PATENT DOCUMENTS 5,495,912 A   3/1996  Gray et al.
5,509,491 A *  4/1996  Hall, III ....................... 180/9.44
(Continued)

FOREIGN PATENT DOCUMENTS

EP   0805059   11/1997
EP   0838359   4/1998
EP   1232892   8/2002

OTHER PUBLICATIONS

International Search Report for related PCT Application No. EP2005/050926, dated Jul. 14, 2005.

*Primary Examiner* — Rami Khatib
(74) *Attorney, Agent, or Firm* — Quarles & Brady LLP (57) ABSTRACT

A drive system for a vehicle is provided, in particular for an agricultural or industrial utility vehicle. The drive system comprises a first and a second drive assembly (, a first and a second branch, at least one control unit and at least one output interface. The first drive assembly is connectable to the first branch. The second drive assembly is connectable to the second branch. The first branch and/or the second branch is/are reversibly connectable to the output interface. The drive assemblies are controllable by the at least one control unit such that the drive assemblies output independently from each other infinitely variable power.

46 Claims, 5 Drawing Sheets

(56) References Cited

U.S. PATENT DOCUMENTS

| | | | |
|---|---|---|---|
| 5,669,842 A * | 9/1997 | Schmidt | 475/5 |
| 6,293,888 B1 * | 9/2001 | Moon | 475/210 |
| 6,558,283 B1 * | 5/2003 | Schnelle | 475/5 |
| 6,566,826 B2 * | 5/2003 | Imai et al. | 318/11 |
| 7,311,629 B2 * | 12/2007 | Vornehm et al. | 475/210 |
| 2002/0082134 A1 * | 6/2002 | Hirt et al. | 477/3 |
| 2002/0109357 A1 * | 8/2002 | Lilley et al. | 290/40 C |
| 2004/0082421 A1 * | 4/2004 | Wafzig | 475/207 |

* cited by examiner

DRIVE SYSTEM FOR A VEHICLE

FIELD OF THE INVENTION

The invention relates to a drive system for a vehicle, particularly for an agricultural or industrial utility vehicle. The present invention further relates to a vehicle with such a drive system, as well as to a drive module and/or a converter module and/or a controller for such a drive system.

BACKGROUND OF THE INVENTION

Electric motors are increasingly being used to drive vehicles, which draw their energy from internal combustion engine driven generators, batteries, or fuel cells. To achieve a higher spread, in many cases shiftable gear stages are arranged after the electric motors, but usually the power transfer is realized without shifting stages. The term "spread" is understood to be the speed range over which nominal power can be reached at the power take off.

For road and rail vehicles, the state-of-the-art procedure currently described usually has been sufficient for achieving the desired driving power. Here, the spread lies on the order of 5-10. The lowest speed at which nominal power is achieved frequently lies over 20 km/h. For agricultural utility vehicles and especially for tractors, this spread is not sufficient. Values over 15 are necessary to cover the driving tasks of a tractor. The lowest speed at which nominal power is achieved lies in the vicinity of 3 km/h. Due to the low absolute speed and high traction force of tractors, shifting processes, with which it must be shifted into a different speed range for a similar traction force, are very uncomfortable due to the transmission jump in the drive system. The continuously variable power shift gears frequently used in tractors typically have two branches, by means of which the torque of the drive module or the energy source is selectively transmitted to the traction drive. When shifting to a different speed range, torque is also transmitted from the drive module to the traction drive during the shifting process (power shift gear). If a shifting process is performed, one branch of the gear is separated or decoupled from the traction drive, while the other branch of the gear is coupled and thus connected to the traction drive. A shifting process is subject to constraining conditions, because the rotational speeds of the two branches must essentially match at the time of the shifting process.

Moreover, in contrast to road and rail vehicles, tractors, in addition to the traction drive, are usually equipped with one or more additional mechanical power take off devices for attachments, a so called power take off (PTO).

SUMMARY OF THE INVENTION

In the following, the term "branch" designates a part of a drive system or a gear, which can transmit mechanical torque, or, very generally, energy. Thus, it can involve a shaft and rotating transmission elements connected to this shaft and/or shifting stages.

Therefore, the present invention is based on the task of specifying and improving a drive system of the type named above, through which the previously mentioned problems are overcome. In particular, a drive system shall be specified, which features a spread that is expanded relative to the state of the art and which at least essentially prevents uncomfortable shifting processes.

According to the invention, the drive system comprises a first and a second drive module, a first and a second branch, at least one controller, and at least one output interface. The first drive module can be connected to the first branch. The second drive module can be connected to the second branch. The first branch and/or the second branch can be connected reversibly to the output interface. The drive modules can be controlled with at least one controller, so that the drive modules can output a given power or energy continuously and independently of each other.

One output interface could be, for example, a shaft, which can be coupled to a traction drive of a vehicle and by means of which, for example, mechanical torque can be transmitted to the drive of the vehicle.

The drive system according to the invention has two branches—especially for continuous shifting processes under loading—between which the system can be shifted back and forth, but which can also be connected simultaneously to the output shaft. The drive modules can be controlled by the controller independently of each other for the output of a given power; for example, in the form of a mechanical torque or very generally in the form of energy. Thus, a state can be created in the drive system, in which the mechanical rotational speeds of the two branches are each adapted to that of the output interface, so that a synchronous shifting process is possible, if, for example, the connection of the first branch to the output interface is broken and the connection of the second branch to the output interface is established. With the drive system according to the invention, the state is also provided that both the first and also the second branch are connected to the output interface, whereby the preferably mechanical power output by the two drive modules can be added. Each of the two branches could have fixed speed and transmission ranges in which they are used.

Due to the independent control of the two drive modules, it is possible to design the speed ranges of the two branches, such that these ranges overlap. Thus, in the overlapping ranges, advantageously one or both branches can be arbitrarily connected to or separated from the output interface. Even if both branches are connected to the output interface, the transmission between the first branch and the output interface and the second branch and the output interface can be adjusted; thus, in contrast to conventional multi step or multi range transmissions, there is not a constraining condition for the existing mechanical transmission. Accordingly, a shifting process of the drive system according to the invention requires only the coupling or decoupling (or connection or disconnection) of one branch to the output interface, for example, such that a corresponding shift coupling between the branch and the output interface is activated. Finally, two shifting processes—for example, the connection of one branch to the output interface and the disconnection of the other branch from the output interface—can lie arbitrarily far apart from each other in time, whereby overall a nearly jerk free shifting of the speed ranges of the drive system is possible.

In principle, it could be provided that a drive module has an internal combustion engine. Especially preferred, a diesel engine would be used in this case. Diesel engines are regularly used, especially for agricultural utility vehicles, due to their multiple control possibilities and their high efficiency. It would be conceivable, for example, that one drive system has two diesel engines.

Alternatively or additionally, a drive module could have an energy source, which generates electric current, for example, a fuel cell. This drive module could further have a mechanical conversion stage, with which the electric current is converted into mechanical torque.

The provision of two energy sources, which can be controlled independently of each other and which can each be connected to the first or to the second branch, is associated in an especially advantageous way with great flexibility in terms of the control possibilities and the operating states of the drive system, but can result in increased production costs. The basic concept of the drive system according to the invention can also be used when only one energy source is provided for a vehicle. In such a case, the drive system also has an input interface and at least one converter module. The input interface can be connected to an energy source, preferably embodied in the form of an internal combustion engine of a vehicle. Energy generated by the energy source or delivered power can be distributed to the first and to the second branch via the input interface. The converter module is connected to the drive modules. The converter module can be connected to the input interface. In the present sense, an input interface is understood to be an interface, which receives energy generated by the energy source and supplies it to the drive system. The input interface could be constructed in the form of a shaft, if the energy source is embodied in the form of an internal combustion engine and provides mechanical torque.

So that the drive modules can output a given power independently of each other or can be operated with a given torque, energy or power can be distributed or transported arbitrarily between the converter module and the drive modules. Such an energy/power transport is preferably controlled by the controller. If the converter module has an electric generator and the two drive modules each has an electric machine, such an energy transport could be realized with the aid of a power electronics controller.

Preferably, an energy source is used, which generates mechanical and/or electrical energy. For controlling the energy source, a separate controller could be provided. In this way, the energy generated by the energy source is variable; thus, it can be adapted to the corresponding operating state of the drive system or a vehicle.

The energy source could have an internal combustion engine, especially a diesel engine. Furthermore, the energy source could include a generator driven by an internal combustion engine and/or a fuel cell and/or an electric storage device, for example, an accumulator, a capacitor, or a battery.

In an especially preferred embodiment, another output interface is provided. This additional output interface could be connected, in principle, reversibly to the first or to the second branch; preferably, the drive system is embodied such that the additional output interface can be connected reversibly to the second branch. The additional output interface could involve a power take off (PTO) for transmitting mechanical torque, which is typically provided on tractors for mechanically driving work equipment.

Very generally, mechanical and/or electrical energy can be transmitted via the input interface, the output interface, and/or the additional output interface. If mechanical energy, for example, in the form of torque, is to be transmitted via an interface, a shaft could be provided for this purpose. Electrical energy could be transmitted inductively or with the aid of sliding contacts by means of correspondingly designed electrical lines.

Preferably the first and/or the second branch and/or the output interface each has at least one mechanical gear stage. With such a gear stage, a rotational speed reduction and/or a rotational speed reversal could be achieved. Thus, the flexibility of a branch can be further increased and the spread of the drive system according to the invention can be increased still more. In detail, the mechanical gear stage could have at least one spur gear stage and/or one planetary gear unit.

Especially preferred, a reversible connection between an output interface and a branch is produced with the aid of a positive fit coupling. Synchronization, which is necessary for this purpose, between the rotational speeds of a shaft allocated to the output interface and a shaft allocated to a corresponding branch can be achieved with the aid of the two drive modules, which can be controlled independently of each other. The positive fit coupling could be shifted by means of an electrically controllable shifting element, but a mechanical or hydraulic activation of the shifting element could also be conceivable. Preferably, the shifting element for coupling or decoupling the reversible connection works against a spring force, so that only an actuator—namely, for example, the electrically activated shifting element—is to be provided. The positive fit coupling could work according to the principle of a claw coupling.

In principle, between the converter module and the two drive modules, an energy or power transport could be performed, which enables part or all of the energy/power provided by the energy source to be distributed arbitrarily from the converter module to the two drive modules. Here, it may be necessary to convert the energy before distributing it; examples for this purpose are given below. Therefore, it is to be provided, in particular, that a converter module receives mechanical and/or electrical energy. Additionally or alternatively, one drive module could output mechanical and/or electrical energy.

In an especially preferred embodiment, a conversion between electrical and mechanical energy is performed with the converter module and the drive modules. For this purpose, the converter module could have at least one electric machine that can be operated as a generator. Furthermore, the first and the second drive modules could each have an electric machine that could be operated as a motor. Thus, for example, the mechanical energy generated by the energy source is fed at least partially to the converter module, which converts this energy into electric current. The electric current is fed to the drive modules, which, on its side, converts this electrical energy back into mechanical torque.

With the converter module and the drive modules, a conversion between hydraulic and mechanical energy could also take place. For this purpose, the converter module could have at least one mechanical drive hydropump. The hydropump is preferably adjustable, so that the amount and thus the pressure of the hydraulic fluid generated by the hydropump is variable. With the hydropump, the mechanical energy is converted into hydrostatic energy. The hydrostatic energy can then be converted back into mechanical energy by a drive module, if the first and/or the second drive module each has a hydromotor. Preferably, such a hydromotor is also adjustable, i.e., the hydromotor can be operated at different rotational speeds for a constant pressure of the hydraulic fluid.

As another example, a purely mechanical conversion between the converter module and the drive modules is conceivable. For this purpose, the converter module could have an input shaft of a gear, for example, a loop gear, a friction gear, or a chain converter. The first and the second drive module could each have at least one output shaft of the corresponding gear.

According to the first embodiment, the input interface is mechanically coupled to the first and to the second branch. The converter module is either allocated to the energy source or the converter module has an electric machine driven by the energy source and operating as a generator. Accordingly, the energy source directly provides electrical energy or is embodied, for example, in the form of an internal combustion engine, which drives the converter module mechanically, so that the converter module—the electric machine operating as a generator—generates electric current. The first and the second drive module each have an electric machine operating as a motor. Here, one of the two drive modules is always connected to its allocated branch.

According to a second embodiment, the input interface is mechanically coupled to one of the two branches. If this branch is connected to the output interface, preferably only mechanical energy is transmitted via this branch. Connection to the drive module allocated to this branch would also be conceivable. The input interface is electrically or hydraulically coupled to the other branch. Here, the converter module has, e.g., an electric machine driven mechanically by the energy source and operating as a generator. The electric machine operating as a generator is then preferably always driven mechanically by the energy source.

The first branch can be driven mechanically by the first drive module. The second drive module can be connected to the second branch or power diverted to this branch that could be realized with the aid of a planetary gear. In the second branch, a brake is provided, with which at least part of the second branch can be stopped relative to a housing of the drive system. The brake could involve a friction brake. Thus, for example, the mechanical torque transmitted by the input interface could be fed to a sun wheel of a planetary gear. The second drive module could be connected to the planet carrier of the planetary gear. The part of the second branch that can be brought into connection with the output interface could be connected to the ring gear of the planetary gear. This part of the second branch could be stopped with the brake, so that for a stopped brake, and thus a stopped ring gear of the planetary gear, the second drive module is driven directly. The electrical energy generated by the converter module and the second drive module can be fed to the first drive module, which can be connected, on its side, to the output interface of the drive system. In this operating state, only the transmission of electrical power to the output interface is performed.

A compact construction can be achieved especially in this embodiment when the converter module and/or the first drive module are/is arranged essentially coaxial to the input interface. The same applies for the case that the second drive module is arranged essentially coaxial to the output interface. All three modules—i.e., the converter module and the two drive modules—are especially preferably arranged coaxial to the input interface.

In structural terms, it is advantageous if the first drive module is arranged spatially downstream of the converter module relative to the input interface. Optionally, it is possible to combine the converter module and the first drive module into one housing. Likewise, the first drive module could be downstream of the second drive module relative to the input interface. Overall, a sequence of components is preferred, which, viewed outwards from the input interface, is arranged as follows: converter module, second drive module, first drive module. Thus, of the converter module and/or the drive modules, preferably at least two modules are arranged essentially coaxial to each other.

Preferably, the first branch and the second branch are each connected reversibly to the output interface via a shiftable multi step transmission. The second branch can be connected reversibly to the other output interface via a shiftable multi step transmission. The shiftable multi step transmission could be embodied such that at least two different transmission ratios can be realized. Here, the torque applied to one branch can be transmitted with different rotational speeds and/or rotational directions to the output interface.

The output interface of the drive system according to the invention could be connected in a vehicle to a traction drive or can be connected in this way. The other output interface could be connected to a power take off (PTO), so that mechanical torque can also be transmitted—for example, to work equipment coupled to a tractor—via the second output interface.

Especially preferred, the drive system is designed such that shifting between the two branches is possible under loading, that is, mechanical torque is always transmitted to the traction drive. Here, the drive system according to the invention is suitable especially for tractors, because, especially when culling during an accelerating phase, a shifting process of the drive system must be performed under loading.

So that the drive system according to the invention can be embodied reliably in terms of operating safety, at least one sensor is provided, with which the operating state of at least one component of the drive system can be detected and fed to the controller. Thus, for example, rotational speed sensors could be provided, which each detect the rotational speed of a shaft of a branch. Furthermore, pressure sensors could detect the pressure of the hydraulic fluid of the hydraulically operating drive modules. The operating state of electrically operating components—the converter module and/or a drive module—could be detected with current/voltage sensors. Also, redundancy is provided in terms of the possible shift or operating states of the drive system.

Because the two branches of the drive system according to the invention can be driven with the aid of the drive modules continuously and completely independently of each other, in contrast to conventional gears, the drive system according to the invention does not necessarily have a well defined shift state or operating states. Instead, the drive system according to the invention can have a plurality of different shift states, of which a few preferred shift states are discussed below merely as examples.

Thus, for example, in a first shift state, the first branch is connected to the output interface and the first drive module is coupled to the first branch. Therefore, in this shift state, the energy delivered by the energy source—for example, in the form of mechanical torque—is output via the first branch to the output interface. Here, for example, a tractor equipped with the drive system according to the invention could perform a slow forward or reverse travel. In principle, the second branch in this shift state has no function. However, in this shift state the second branch could be connected to the other output interface and the second drive module could be coupled to the second branch. Thus, in the tractor equipped with the drive system according to the invention, in the second shift state the power take off could be connected and adjustable independently in its rotational speed.

In a second shift state, the first and the second branch are connected to the output interface. Here, the power transmitted from the first and the second branches to the output interface are added, so that in this shift state, a tractor equipped with the drive system according to the invention can perform a slow forward or reverse travel, especially for large traction force requirements. Here, the rotational speeds of the two drive modules could be set to the rotational speed of the output interface or synchronized with this speed. The other output interface—in the example of a tractor the power take off—is in this shift state dependent on the traveling speed and therefore can be used as a so called "motion power take off."

Thus, preferably a third shift state is further provided, in which the second branch is connected to the output interface. In a corresponding design or construction of the drive system according to the invention for a tractor, in this shift state, the traveling speed could be significantly higher and the traction force could be significantly lower than, for example, in the first shift state. In the third shift state, it is preferably provided that the second branch is connected to the other output interface. For the example of a tractor equipped with the drive system according to the invention—here the rotational speed of the output interface; i.e., the traction drive—would be coupled with the rotational speed of the other output interface; i.e., the power take off, so that in this shift state, a "motion power take off" can also be realized.

DESCRIPTION OF THE PREFERRED EMBODIMENT

The same or similar assemblies are characterized in the figures with the same reference symbols.

Figure 1:
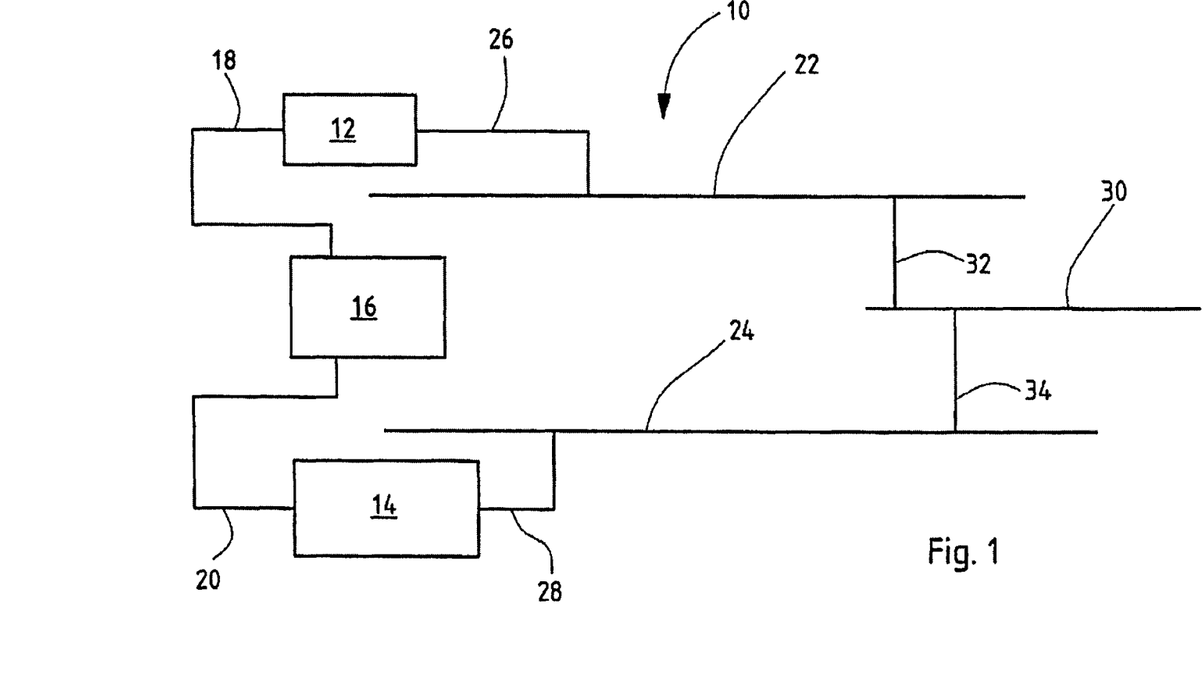
FIG. 1, is a first embodiment according to the invention.

FIG. 1 shows a first embodiment of a drive system 10 according to the invention.

The drive system 10 comprises a first drive module 12 and a second drive module 14, which can be controlled by the controller 16 via the lines 18, 20. The two drive modules 12, 14 can be controlled by a controller 16 independently of each other and can continuously output power set by the controller 16. The drive system 10 comprises a first branch 22 and a second branch 24, wherein the two branches in FIG. 1 are shown merely schematically in the form of a shaft.

The drive module 12 can be connected to the first branch 22 via the schematically shown gear connection 26. The drive module 14 can be connected to the second branch 24 via the schematically shown gear connection 28. Preferably, the gear connections 26, 28 are always connected; for example, an output shaft of the drive modules 12, 14 is locked in rotation via a corresponding gear connection 26, 28 to the first and to the second branch 22, 24, respectively.

The drive system further comprises the output interface 30, which can be connected reversibly to the first and/or to the second branch 22, 24. Each connection is realized schematically with a module 32, 34.

For example, the drive modules 12, 14 can each involve an internal combustion engine embodied in the form of a diesel engine. However, at least one of the two drive modules 12, 14 could also be embodied in the form of a fuel cell, which initially generates electric current, which is converted by a conversion stage (not shown in FIG. 1) into mechanical torque.

Assuming that the two drive modules 12, 14 are always locked in rotation with the two branches 22, 24, in principle, three shift states of the drive system 10 are conceivable. In a first shift state, only the drive module 12 is controlled by the controller 16, so that the torque generated by the drive module 12 is transmitted to the branch 22 via the gear connection 26. The first branch 22 is connected in this shift state to the output interface 30 via the module 32, so that the branch 22 transmits the torque to the output interface 30. A vehicle equipped with such a drive system 10 could be driven forwards in this shift state, for example, in a first speed range.

In a second shift state of the drive system 10, only the drive modules 14 are controlled by the controller 16. The second branch 24 is connected to the output interface 30 via the module 34, so that the torque generated by the drive module 14 is transmitted to the output interface 30 via the second branch 24. In this shift state, the vehicle could be driven forwards at a greater speed, for example, in a second traveling range.

In a third shift state of the drive system, both drive modules 12, 14 are controlled by the controller 16, wherein both the first branch 22 and also the second branch 24 are connected to the output interface 30 via the modules 32, 34. In this shift state, the torque generated by the two drive modules 12, 14 is transmitted as a sum to the output interface 30. Here, the first and the second branch 22, 24 have a fixed rotational speed ratio, which is adapted to the rotational speed of the output interface 30. In this shift state, the vehicle could be operated under increased load.

Figure 2:
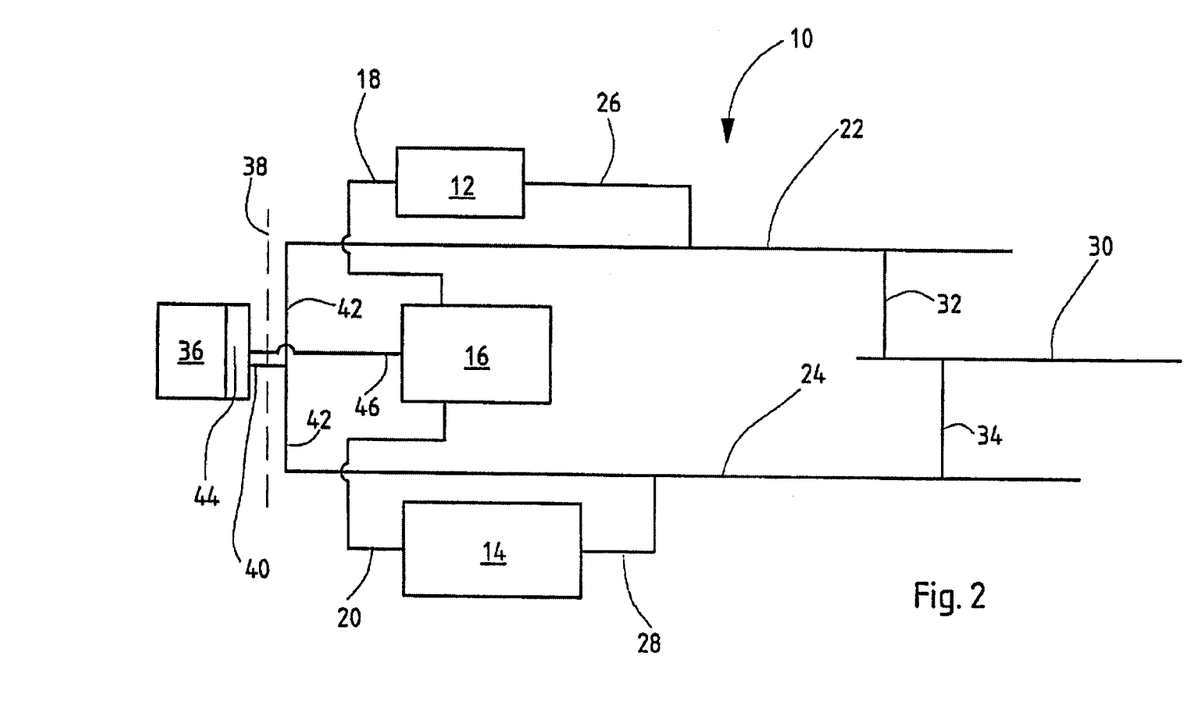
FIG. 2, is a second embodiment according to the invention.

FIG. 2 also shows in a schematic view a second embodiment of a drive system 10 according to the invention. In terms of the components shown in FIG. 1, the drive system 10 shown in FIG. 2 is comparably constructed. In this embodiment, an energy source 36 is provided, which can be connected at the input interface 38 (shown with dashed lines) to the drive system 10. In detail, the energy source 36 comprises a diesel engine, which is coupled to the input shaft 40 of the drive system 10. The diesel engine transmits mechanical torque to the two branches 22, 24, which is realized with the aid of the schematically shown component 42. The energy source 36 also comprises a converter module 44, which is also driven mechanically by the diesel engine or the energy source 36. The converter module 44 comprises an electric machine, which operates as a generator and which generates electric alternating current when the diesel engine is operating. The generated alternating current is first converted into direct current by a rectifier unit allocated to the converter module 44 (and not shown in FIG. 2) and fed to the two drive modules 12, 14 via the input interface 38 with the aid of the connection line 46 via the controller 16. The two drive modules 12, 14 are electric machines, which are constructed in the form of motors and which each has a rectifier unit (not shown in FIG. 2) with which the direct current is converted into alternating current. The controller 16 comprises power electronics, which enables it to feed electric current merely to the first and/or to the second drive module 12, 14, so that also in this embodiment, the two drive modules 12, 14 can each drive the first and/or the second branch 22, 24 continuously and independently of each other and thus—analogous to the functioning in the embodiment from FIG. 1—also the drive interface 30.

Figure 3:
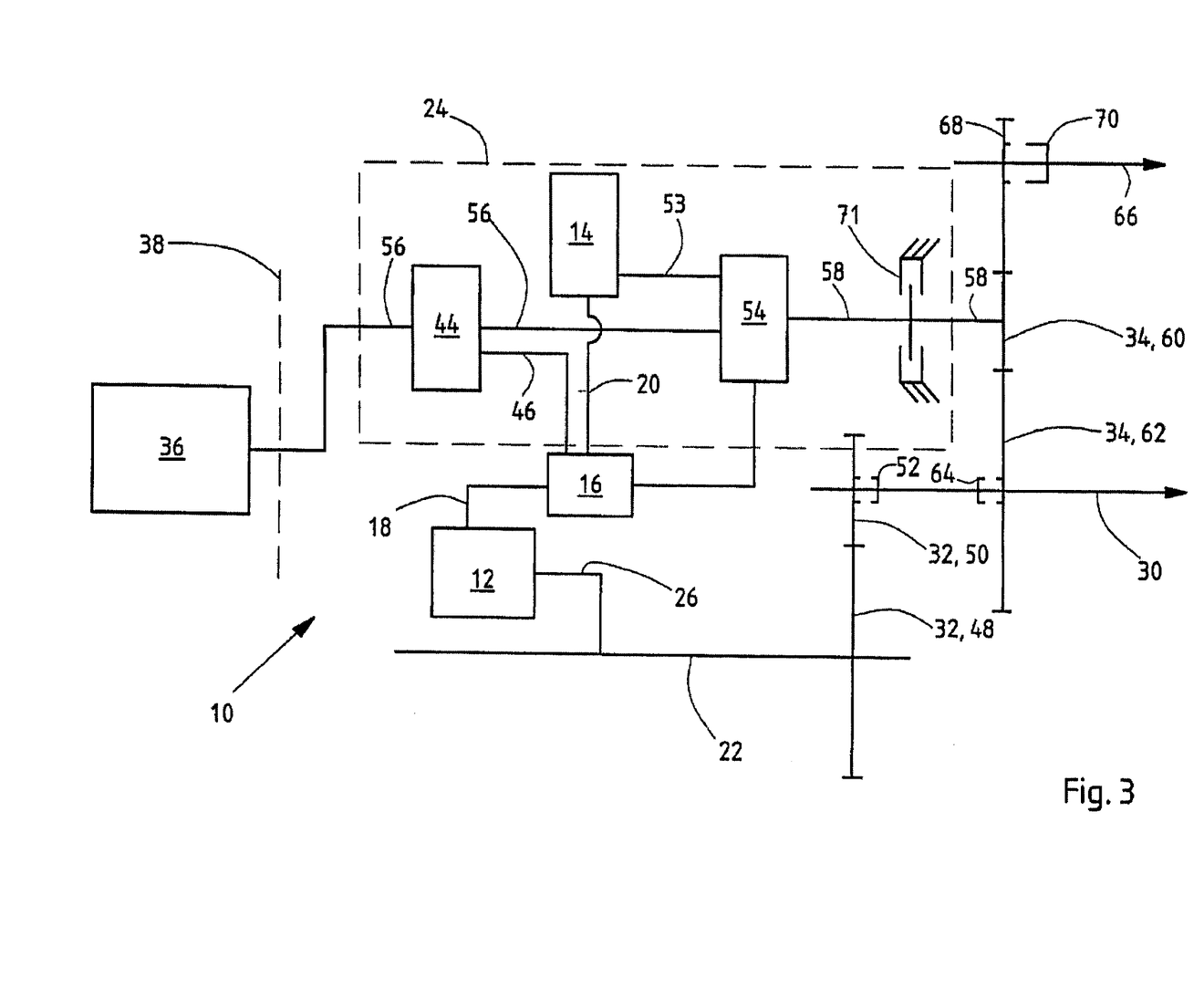
FIG. 3, is a third embodiment according to the invention.

FIG. 3 shows a third embodiment of the present invention, wherein the drive system 10 according to the invention can be connected at its input interface 38 to a energy source 36 constructed in the form of a diesel engine. In this embodiment, the energy source 36 is mechanically coupled to the second branch 24. The first branch 22 is non mechanically coupled to the energy source 36. The converter module 44, which is constructed in the form of an electric machine embodied as a generator, is always coupled to and driven with the second branch 24. The electric current generated by the converter module 44 is fed via the connection line 46 to the controller 16, which on its side can temporarily store the electric current in a buffer (not shown in FIG. 3); for example, in a capacitor or accumulator. On the one hand, the second drive module 14 can be driven via connection line 20 and, on the other hand, the first drive module 12 can be driven via connection line 18.

The first branch 22 can be driven only by the first drive module 12 via the gear connection 26. The first branch 22 can be connected to the output interface 30 via the two meshing spur gears 48, 50, as long as the shift point 52 creates a rotationally locked connection between the output interface 30 constructed in the form of a shaft and the spur gear 50. The second drive module 14 can be connected to the second branch 24 via a shaft 53 via a gear stage 54 constructed in the form of a planetary gear. In this respect, it is conceivable that the mechanical torque generated by the energy source 36 is transmitted to the output interface 30 via the shafts 56, 58, and also via the two spur gears 60, 62, as long as the shift point 64 creates a rotationally locked connection between the spur gear 62 and the output interface 30.

However, it would also be conceivable for the shaft 56 to be decoupled from the shaft 58 and the drive module 14 to be connected to the shaft 58. In this case, the electric current generated by the converter module 44 is led by means of the controller 16 to the drive module 14, which drives the shaft 53, so that the mechanical torque generated by the drive module 14 is transmitted to the output interface 30 via the gear stage 54, the shaft 58, the two spur gears 60, 62, and the closed shift point 64. Finally, a shift state for the second branch 24 is also conceivable, in which, via gear stage 54, mechanical torque is transmitted as a sum to the shaft 58 both from the shaft 56 and also from the shaft 53, so that, on the one hand, the torque generated by the energy source 36 can be transmitted and, on the other hand with the mechanical torque generated by the second drive module 14 can be ultimately transmitted to the output interface 30. In this shift state, the shafts 56, 53, and 58 are coupled to each other via the gear stage 54.

The drive system 10 from FIG. 3 comprises a second output interface 66, which is locked in rotation via the shift point 70 via a spur gear 68 meshing with the spur gear 60. The second output interface 66 could be, for example, a power take off of a tractor, which is equipped with a drive system 10. A brake 71, with which the shaft 58 and the corresponding part of the gear stage 54 can be stopped relative to a housing of the drive system 10 (not shown in FIG. 3), is provided for the shaft 58. If the brake 71 is engaged, not only the converter module 44, but also the second drive module 14 is driven by the energy source 36. In this mode, the second drive module 14 is operated as a generator, so that both the converter module 44 and also the second drive module 14 can each generate electric current and the first drive module 12 or an electrical on board distribution system (not shown in FIG. 3) can be made available.

Figure 4:
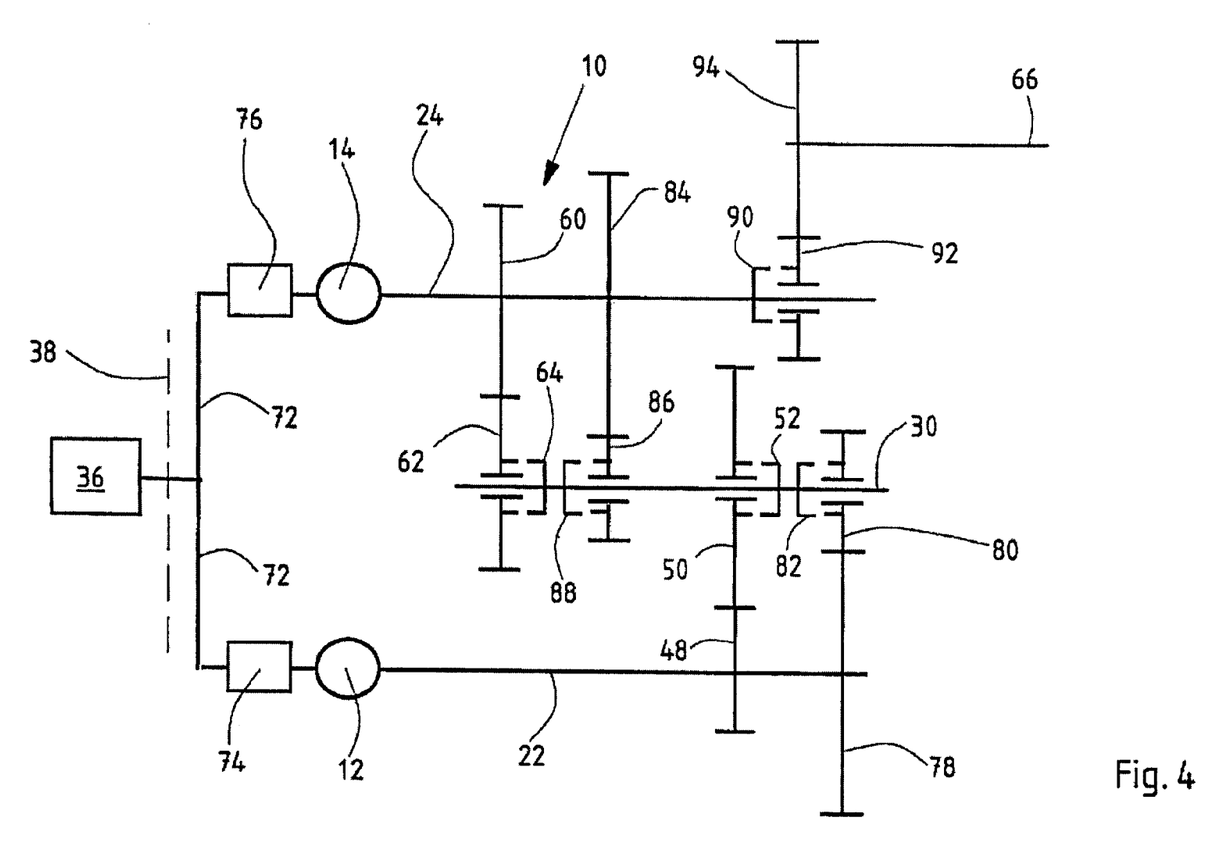
FIG. 4, is a fourth embodiment according to the invention.

FIG. 4 shows a fourth embodiment of the present invention. Here, the drive system 10 can be connected to an electrical energy source 36 via the input interface 38, wherein the energy source 36 could be a generator driven by an internal combustion engine or a fuel cell. The electrical energy generated by the energy source 36 is fed to the controllers with rectifier units 74 or 76 of the two drive modules 12, 14 via the connection lines 72.

The electrical energy could involve direct current. However, if the energy source 36 has a generator driven by an internal combustion engine, this engine typically delivers alternating or rotating current at a frequency dependent on its rotational speed. Because the drive modules 12, 14 were to be operated at a constantly changing frequency, the drive modules 12, 14 could output an arbitrary given power, although not unlimited. Therefore, the alternating or rotating current is first converted into direct current with the aid of a rectifier unit not shown in the figures, before it is fed to the controllers 74, 76. The electrical energy converted into direct current is converted back into alternating current at a given frequency, in this case with the aid of another rectifier unit allocated to each controller 74, 76, in order to finally drive the drive modules 12, 14 constructed in the form of electric motors. The drive modules 12, 14 each drive the first or second branch 22, 24.

The first branch 22 can be connected to the output interface 30, on the one hand with the aid of the two spur gears 48, 50 via the shift point 52. On the other hand, the first branch 22 can be connected to the output interface 30 via the spur gears 78, 80 and the shift point 82. The second branch 24 can be connected to the output interface 30 via the spur gears 60, 62 and the shift point 64. Furthermore, the second branch 24 can be connected to the output interface 30 via the spur gears 84, 86 and the shift point 88. Depending on the shift points 64, 88, 52, and 82, the first branch 22 and/or the second branch 24 can be reversibly connected to the output interface 30. The second branch 24 can be reversibly connected to the second output interface 66 via the shift point 90 and the spur gears 92, 94.

The drive system 10 shown in FIG. 4 is provided in an especially preferred way for a tractor and designed or configured such that it is distinguished by at least four travel ranges. In a first travel range, the shift point 52 is coupled so that the drive module 12 is locked in rotation with the output interface 30 via the spur gears 48, 50, wherein the output interface 30 is connected to a traction drive in a tractor. By changing the rotational speed and reversing the direction of rotation of the drive module 12, the traveling speed of the tractor can be changed or the direction of travel can be reversed. Operating the other output interface 66 in this travel range is possible via the second branch 24, wherein the output interface 66 is connected to a power take off in a tractor.

In a second travel range, the shift points 52 and 64 are coupled or closed simultaneously so that the drive module 12 is locked in rotation via the spur gears 48, 50 and the drive module 14 is locked in rotation via the control line 60, 62 to the output interface 30 and thus to the traction drive of the tractor. Here, the drive power of the two drive modules 12, 14 combine, so that for the same traveling speed of the tractor, a higher traction force and a higher power are made available. In this shift state, operation of the other output interface 66 is not possible or possible only to a limited extent. The traveling speed in the first and in the second traveling range is limited by the highest permissible rotational speed of the drive module 12.

In a third traveling range of the tractor, the shift point 64 is closed, so that the second drive module 14 is connected via the spur gears 60, 62 to the output interface 30. In a useful design of the drive system 10 according to the invention, the traveling speed is significantly higher in this third traveling range and the traction forces are significantly lower than in the first traveling range, so that an expansion of the spread is achieved.

A transition from the first to the second traveling range and back can take place by closing or opening the shift point 64 at a synchronized rotational speed between the drive interface 30 and the spur gear 62 and without changing the torque flow in the traction drive and thus it is also unnoticed by the driver.

A transition from the second to the third traveling range and back can take place by opening or closing the shift point 52 at a synchronized rotation speed between the drive interface 30 and the end wheel 50 and without changing the torque flow in the traction drive and thus it is also unnoticed by the driver as well.

In the first traveling range of the tractor, the second drive module 14 is not used for the traction drive. Therefore, it can be locked in rotation by means of the shift point 90 to the other output interface 66, i.e., the power take off of the tractor. By changing the rotational speed of the second drive module 14, the rotational speed of the other output interface 66 can change continuously. It then corresponds to its function of a modern "motor power take off."

Also in the second and third traveling range, the shift point 90 can be closed and thus the other output interface 66 can be driven. The power take off rotational speed then changes in proportion to the traveling speed. The power take off thus corresponds to its function of a modern "motion power take off."

In principle, it is possible to increase the number of traveling ranges through other transmission stages and shift elements arbitrarily and/or to increase the necessary spread of the drive system 10 according to the invention and/or to reduce the necessary spread of the two drive modules 12, 14, without losing the advantages of synchronous, no load shifting. A fourth traveling range is produced by simultaneously closing of the shift points 64 and 82, a fifth traveling range is produced by closing only the shift point 82, a sixth traveling range is produced by closing the shift points 88 and 82, and a seventh traveling range is produced by closing just the shift point 88. In the traveling ranges two, four, and six, the traction drive power is transmitted from the two drive modules 12, 14, so that a higher power is made available than in the ranges one, three, and five. For suitable selection of the transmission ratios, it is possible to cover the entire range of speeds of a tractor with the ranges with simultaneous power transfer, so that traveling can preferably be performed in these ranges. It is then also possible to design the two drive modules 12, 14 not for the entire drive power of the tractor.

By simultaneously closing two suitable shift points, the traction drive can be blocked, and thus a function of a parking brake device can be achieved. In the embodiment from FIG. 4, these could be, for example, the shift points 52 and 82 or 64 and 88. Thus, the embodiment of a drive system 10 according to the invention sketched in FIG. 4 is distinguished by a uniform design for the traveling and power take off mode. A good use of installation space can be achieved. The drive modules 12, 14 constructed in the form of electric machines can have a smaller size than the machines typically used from the state of the art. High traction forces can also be achieved for low traveling speeds without over dimensioning the two drive modules 12, 14 through parallel connection of the two drive modules 12, 14. Especially advantageously, a shifting process can take place at a synchronized rotational speed via another range, wherein a torque free or jerk free shifting is possible.

Figure 5:
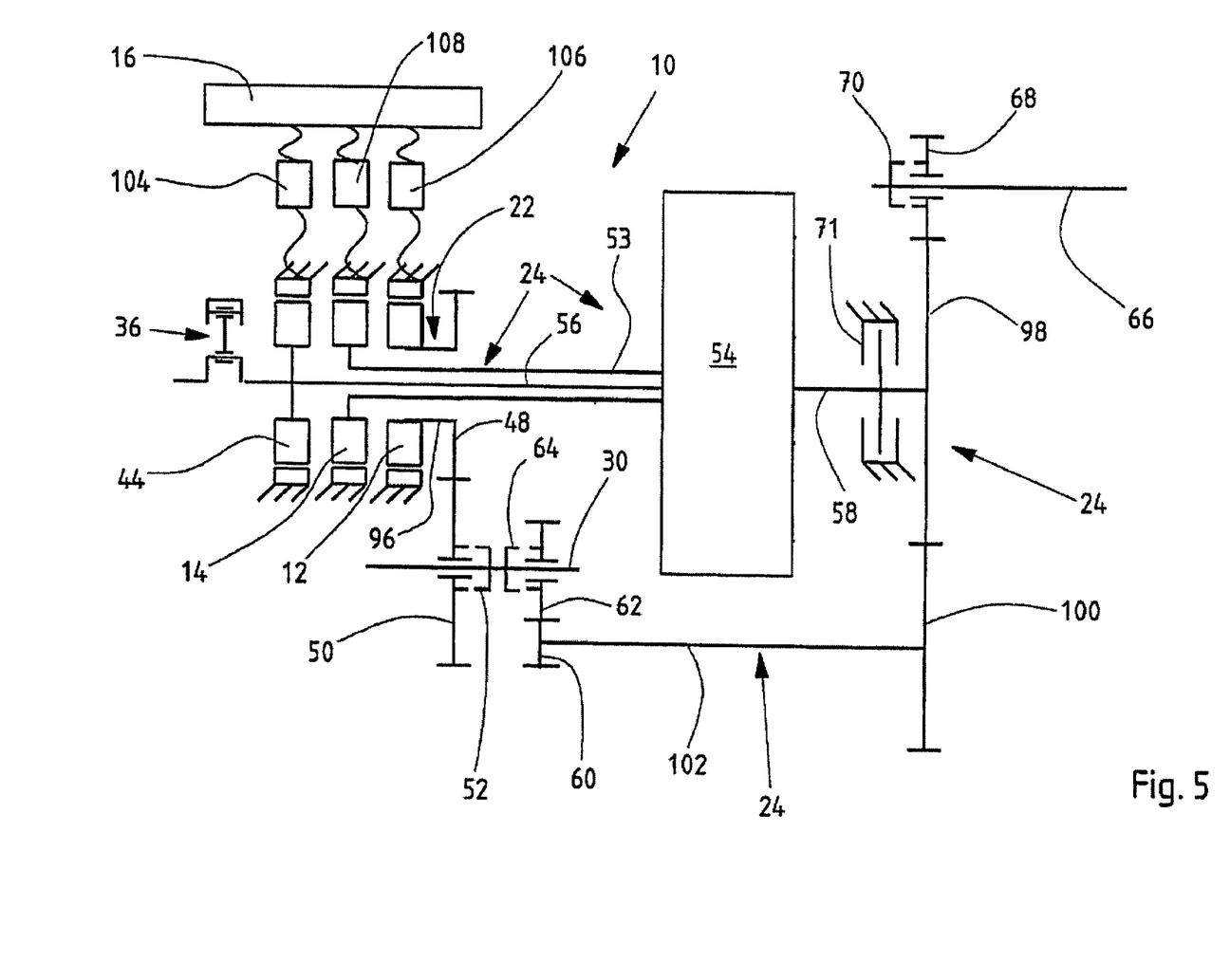
FIG. 5, is a fifth embodiment, which is similar to the embodiment from FIG. 3 and shows more details.

FIG. 5 shows a fifth embodiment of a drive system 10 according to the invention, which is similar to the embodiment from FIG. 3, also in its functioning, and where equivalent or similar components are represented by the same reference symbols. Thus, the first branch 22 of the drive system 10 includes, in addition to the first drive module 12, essentially a hollow shaft 96, which is locked in rotation with the spur gear 48. The spur gear 48 meshes with the spur gear 50, which can be connected reversibly to the first output interface 30 via the shift point 52. The second branch 24 includes, on the one hand, the shaft 56, which is driven by the energy source 36 constructed in the form of a diesel engine. The second branch 24 further includes the converter module 44, which is always driven by the diesel engine 36. The second branch 24 further includes a hollow shaft 53, which is locked in rotation with the rotor of the second drive module 14 constructed in the form of an electric machine. The shaft 56 and the hollow shaft 53 are connected to the planetary gear 54, wherein the planetary gear is further connected to the shaft 58. The second branch 24 further includes the brake 71, with which the shaft 58 and a part of the planetary gear 54 can be stopped, as well as the spur gears 98, 100 meshing with this gear, and also the two spur gears 60, 62 meshing with each other. The shaft 102 rotationally locks the two spur gears 100, 60 to each other. The spur gear 62 of the second branch 24 can be connected to the shift point 64 reversibly to the output interface 30. The second branch 24 can be further connected reversibly to the second output interface 66 via the spur gear 68 meshing with the spur gear 98 via the shift point 70.

In this embodiment, the output interface 30 is also connected to the traction drive of a tractor not shown in FIG. 5 and also the output interface 66 is connected to the power take off of a tractor similarly not shown in FIG. 5. The converter module 44 and also the first and the second drive module 12, 14 are connected via connection lines and each to a frequency converter 104, 106, and 108. The controller 16 is connected to each frequency converter 104, 106, 108. Thus, the converter module 44 can be operated by the controller 16 and the frequency converter 104 in one direction of rotation—namely, that of the diesel engine 36—and in two torque directions for braking or accelerating. The drive modules 12, 14 can be operated by the controller 16 and each frequency converter 106, 108 in two directions of rotation and in two torque directions for braking or accelerating.

The controller 16 is connected to sensors (not shown in FIG. 5) and a data interface for vehicle relevant information of the operating state of the diesel engine 36. It also receives the rotational speed of the other output interface 66, wheel or axle rotational speeds, which are detected by corresponding sensors (not shown in FIG. 5) and which are made available to the controller 16. In this respect, the controller 16 shown in FIG. 5 acts as a higher order controller of a vehicle equipped with the drive system 10 according to the invention and also takes over the energy management of the vehicle, as well as the power supply for other electric loads (also not shown).

The embodiment according to FIG. 5 also includes a first traveling range in which the other output interface 66 is not activated. Here, the shift point 52 is coupled so that the spur gears 48, 50 are locked in rotation with the output interface 30, and thus the first branch 22 is driven by the first drive module 12. The brake 71 constructed in the form of a friction brake is here closed so that the converter module 44 and the second drive module 14 operating as a generator are driven by the diesel engine 36, and the electrical power generated in this way is made available to the first drive module 12 operating as a motor. By changing the rotational speed and reversing the direction of rotation of the first drive module 12, the traveling speed of the vehicle can be changed and the traveling direction reversed.

The brake 71 is opened in a second traveling range. The rotational speed of the diesel engine 36 and the rotational speed of the second drive module 14 combine in the planetary gear 54. The interface 64 for a synchronized rotational speed can be connected to the spur gear 50 via the shaft 58, the spur gears 98, 100, the shaft 102, the spur gears 60 and 62. In the second traveling range, it is not possible to use the other output interface 66. The shift point between the branches 22, 24 must not be realized at a discrete rotational speed. Depending on the design of the components, there is a certain overlapping range of rotational speeds of the direct and power diverted paths. Here, in an especially advantageous way, a comfortable and efficient shifting process is enabled.

Instead of shifting from the first to the second traveling range, the other output interface 66—and thus for a tractor, the power take off—can also be activated. Here, the shift point 64 is opened and the shift point 70 is closed. The brake 71 is opened and power can be taken at the other output interface 66.

The rotational speed of the diesel engine 36 can be freely selected within limits according to power requirements. The control of the diesel engine 36 as well as the control of the converter module 44 and the first and second drive module 12, 14 can be realized, such that an optimal objective stored in a higher-order controller—e.g., in the controller 16—is rejected. The optimal objective can be, for example, lower fuel consumption or the lowest possible noise production. The design of this embodiment combines a continuous traction drive with a continuous power take off. Therefore, in a conventional tractor equipped with the drive system 10 according to the invention, the two installation spaces typically provided for these components is available for use.

The converter module 44 and the first and second drive modules 12, 14 form the electric drive part of the drive system 10 shown in FIG. 5. They are combined together compactly downstream of the diesel engine 36 and can thus be installed in an optimal environment for electric machines, for example, no oil in the gear and stators water cooled from the outside. For the installation of the drive system 10 according to the invention from FIG. 5 in a tractor, the shift points 52, 64 and also the spur gears 48, 50, 60, 62 can also be located in front of the differential housing. The planetary gear 54, the brake 71, and also the spur gears 68, 98, 100 could be housed in the installation space of the power take off.

Other variations for this embodiment are conceivable. Thus, for example, for shifting to the second traveling range, a power shift coupling can be used. The second branch 24 and/or the second output interface 66 could also have a direct, instead of power diverted, configuration. The shift point 70 could have another transmission ratio. An electric front wheel drive can replace a mechanical front wheel drive. An electrically driven front axle with one or two electric machines can replace one conventional front wheel drive.

Finally, it should be specifically mentioned that the previously explained embodiments are used merely for describing the claimed teaching, but this is not limited to the embodiments.

Having described the preferred embodiment, it will become apparent that various modifications can be made without departing from the scope of the invention as defined in the accompanying claims.

The invention claimed is:

1. A drive system for a vehicle with a first and a second drive module, a first and a second branch, at least one controller, an enemy source, an input interface, and at least one output interface,
   wherein the first drive module is connected to the first branch,
   wherein the second drive module is connected to the second branch,
   wherein at least one of the first branch and the second branch is connected to the output interface,
   wherein the drive modules are controlled with at least one controller, such that the drive modules can output a given power continuously and independently of each other,
   wherein the input interface is connected to the energy source,
   wherein enemy generated by the enemy source is distributed via the input interface to the first and to the second branch,
   wherein the first branch and the energy source are configured to deliver mechanical power to the at least one output interface via a first summing gearset, and
   wherein the second branch is configured to deliver mechanical power to the at least one output interface without using the first summing gearset.

2. A drive system according to claim 1, wherein one drive module has an internal combustion engine.

3. A drive system according to claim 1, wherein one drive module has an energy source generating electric current and a mechanical conversion stage.

4. A drive system according to claim 1, wherein at least one converter module is provided, wherein the converter module is connected to at least one drive module, and wherein the converter module is connected to the input interface.

5. A drive system according to claim 4, wherein energy is distributed or transported arbitrarily between the converter module and at least one drive module.

6. A drive system according to claim 4, wherein the energy source generates one of mechanical and electrical energy.

7. A drive system according to claim 4, wherein a controller is provided, which controls the energy source, whereby the energy generated by the energy source is variable.

8. A drive system according to claim 4, wherein the energy source includes one of an internal combustion engine, a generator driven by an internal combustion engine, a fuel cell, and an electrical storage device.

9. A drive system according to claim 4, wherein a converter module receives one of mechanical and electrical energy.

10. A drive system according to claim 4, wherein a drive module outputs one of mechanical and electrical energy.

11. A drive system according to claim 4, wherein a conversion between electrical and mechanical energy is performed with the converter module and the drive modules.

12. A drive system according to claim 11, wherein the converter module has at least one electric machine that is operated as a generator.

13. A drive system according to claim 11, wherein the first and the second drive module each has an electric machine that can be operated as a motor.

14. A drive system according to claim 4, wherein a conversion between hydraulic and mechanical energy is performed with the converter module and the drive modules.

15. A drive system according to claim 14, wherein the converter module has at least one mechanically driven hydropump.

16. A drive system according to claim 14, wherein the first and the second drive module each has a hydromotor.

17. A drive system according to claim 4, wherein mechanical energy is converted with the converter module and the drive modules.

18. A drive system according to claim 17, wherein the converter module has one of an input shaft of a belt gear, a friction gear, and a chain converter.

19. A drive system according to claim 18, wherein the first and the second drive module each has at least one output shaft of the corresponding gear.

20. A drive system according to claim 4, wherein the input interface is mechanically coupled to the first and the second branch.

21. A drive system according to claim 20, wherein the converter module is one of allocated to the energy source and configured to have an electric machine driven by the energy source and operating as a generator.

22. A drive system according to claim 20, wherein each of the first and the second drive module has an electric machine operating as a motor.

23. A drive system according to one of claim 4, wherein the input interface is one of electrically coupled and hydraulically coupled to one of the two branches and the input interface is mechanically coupled to the other of the two branches.

24. A drive system according to claim 23, wherein the converter module has an electric machine driven mechanically by the energy source and operating as a generator.

25. A drive system according to claim 23, wherein the first branch is driven mechanically with the first drive module.

26. A drive system according to claim 23, wherein the second drive module is one of connected to the second branch and configured to have a power diverted arrangement to this branch.

27. A drive system according to claim 23, wherein a brake, with which at least one part of the second branch can be stopped relative to a housing of the drive system, is provided in the second branch.

28. A drive system according to claim 23, wherein the first drive module is arranged spatially downstream of the converter module with reference to the input interface and wherein the first drive module is arranged downstream of the second drive module with reference to the input interface.

29. A drive system according to claim 4, wherein at least two of the converter module, the first drive module, and the second drive module are arranged essentially coaxial to each other.

30. A drive system according to claim 1, wherein another output interface is provided, which is connected reversibly to one of the two branches.

31. A drive system according to claim 30, wherein one of mechanical and electrical energy is transmitted via one of the input interface, the output interface, and the other output interface.

32. A drive system according to claim 30, wherein the second branch is connected reversibly to the other output interface via a shiftable multi-step transmission.

33. A drive system according to claim 30, wherein the output interface is connected to a traction drive and the other output interface is connected to a power take-off (PTO).

34. A drive system according to claim 30, wherein the second branch is connected to the other output interface and wherein the second drive module is connected to the second branch.

35. A drive system according to claim 30, wherein in a third shift state, the second branch is connected to the output interface and the second branch is connected to the other output interface.

36. A drive system according to claim 1, wherein a shaft is provided for transmitting mechanical energy.

37. A drive system according to claim 1, wherein one of the first and the second branch and the output interface each has at least one mechanical gear stage, with which a rotational speed reduction and a rotational speed reversal is achieved.

38. A drive system according to claim 37, wherein the mechanical gear stage has one of at least one spur gear stage and a planetary gear unit.

39. A drive system according to claim 1, wherein a reversible connection between the output interface and one of the first and the second branches is established with the aid of a positive-fit coupling.

40. A drive system according to claim 39, wherein the positive-fit coupling works according to the principle of a claw coupling.

41. A drive system according to claim 1, wherein the first branch and the second branch are each connected reversibly to the output interface via a shiftable multi-step transmission.

42. A drive system according to claim 41, wherein at least two different transmission ratios are realized with the shiftable multi-step transmission.

43. A drive system according to claim 1, wherein it is possible to shift between the two branches under loading.

44. A drive system according to claim 1, wherein at least one sensor is provided, with which the operating state of at least one component of the drive system is detected and is fed to the controller, so that the possible shift states of the drive system are detected redundantly.

45. A drive system according to claim 1, wherein in a first shift state, the first branch is connected to the output interface and wherein the first drive module is connected to the first branch.

46. A drive system according to claim 1, wherein in a second shift state, the first and the second branch are connected to the output interface and wherein the rotational speeds of the two drive modules are one of tuned and synchronized to the rotational speed of the output interface.

* * * * *

UNITED STATES PATENT AND TRADEMARK OFFICE
CERTIFICATE OF CORRECTION

PATENT NO. : 8,660,724 B2  
APPLICATION NO. : 10/590003  
DATED : February 25, 2014  
INVENTOR(S) : Nicolai Tarasinski and Rainer Gugei Page 1 of 1

It is certified that error appears in the above-identified patent and that said Letters Patent is hereby corrected as shown below:

In the Claims:

Col. 13, line 44, "enemy" should read --energy--

Col. 13, line 57, "enemy generated by the enemy source" should read --energy generated by the energy source--

Signed and Sealed this
Third Day of June, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,660,724 B2 | Page 1 of 1 |
| APPLICATION NO. | : 10/590003 | |
| DATED | : February 25, 2014 | |
| INVENTOR(S) | : Nicolai Tarasinski and Rainer Gugel | |

It is certified that error appears in the above-identified patent and that said Letters Patent is hereby corrected as shown below:

Title Page:

Item (75) Inventor "Rainer Gugei" should be --Rainer Gugel--

Signed and Sealed this
Fourteenth Day of October, 2014

Michelle K. Lee
*Deputy Director of the United States Patent and Trademark Office*